US 8,118,386 B2

(12) United States Patent
Kojima

(10) Patent No.: US 8,118,386 B2
(45) Date of Patent: Feb. 21, 2012

(54) LIQUID BODY DISCHARGE DEVICE AND METHOD FOR DISCHARGING LIQUID BODY

(75) Inventor: Kenji Kojima, Suwa (JP)

(73) Assignee: Seiko Epson Corporation (JP)

( * ) Notice: Subject to any disclaimer, the term of this patent is extended or adjusted under 35 U.S.C. 154(b) by 538 days.

(21) Appl. No.: 12/357,440

(22) Filed: Jan. 22, 2009

(65) Prior Publication Data

US 2009/0189950 A1 Jul. 30, 2009

(30) Foreign Application Priority Data

Jan. 25, 2008 (JP) ................................ 2008-014566

(51) Int. Cl.
*B41J 2/01* (2006.01)

(52) U.S. Cl. ............................................ 347/12; 347/43

(58) Field of Classification Search ................ 347/9, 12, 347/13, 40, 42, 43
See application file for complete search history.

(56) References Cited

U.S. PATENT DOCUMENTS

| 7,182,815 | B2 | 2/2007 | Katagami et al. | |
|---|---|---|---|---|
| 7,678,697 | B2* | 3/2010 | Hirai | 438/674 |
| 2004/0246298 | A1* | 12/2004 | Ito et al. | 347/40 |
| 2005/0099453 | A1* | 5/2005 | Nakamura | 347/40 |
| 2005/0128246 | A1* | 6/2005 | Ogawa et al. | 347/40 |
| 2006/0146379 | A1 | 7/2006 | Katagami et al. | |
| 2006/0214987 | A1* | 9/2006 | Nakamura | 347/40 |
| 2008/0266354 | A1* | 10/2008 | Kawase | 347/43 |
| 2009/0122110 | A1 | 5/2009 | Yoshioka | |
| 2009/0184999 | A1 | 7/2009 | Kojima | |
| 2010/0328397 | A1* | 12/2010 | Kitahara et al. | 347/40 |

FOREIGN PATENT DOCUMENTS

| JP | 2002-27389 | 9/2002 |
|---|---|---|
| JP | 2002-273868 | 9/2002 |
| JP | 2006-346575 | 12/2006 |
| JP | 2007-007544 | 1/2007 |
| JP | 2007-136330 | 6/2007 |
| JP | 2009-175213 | 8/2009 |

* cited by examiner

*Primary Examiner* — Huan Tran

(74) *Attorney, Agent, or Firm* — Harness, Dickey & Pierce, P.L.C.

(57) ABSTRACT

A liquid body discharge device includes: a head; and a plurality of nozzles provided to the head. In the device, a liquid body is discharged from the plurality of nozzles to a liquid body discharged region of a substrate by moving one of the substrate and the head, and the nozzles are aligned in a first alignment direction and a second alignment direction.

8 Claims, 13 Drawing Sheets

LIQUID BODY DISCHARGE DEVICE AND METHOD FOR DISCHARGING LIQUID BODY

BACKGROUND

1. Technical Field

The present invention relates to a liquid body discharge device and a method for discharging a liquid body.

2. Related Art

There have been liquid body discharge devices that discharge liquid bodies such as functional liquid bodies and ink to substrates made of glass, ceramic, resin, or silicon to form (also referred to as "draw") predetermined patterns (also referred to as "drawing patterns"). One of such devices includes a head in which a discharge mechanism and a circuit substrate to control the discharge mechanism are built. The discharge mechanism discharges a liquid body by applying a pressure to the liquid body in a pressure chamber provided in a middle of a flow path through which the liquid body flows by using an electrostrictive property of a piezoelectric element or thermal energy. The liquid body is discharged from a nozzle that is provided to the head and located at the end of the flow path. Typically, a plurality of nozzles is formed as a nozzle group. The nozzles are aligned in a substantially straight line as the alignment direction with a predetermined nozzle distance (pitch).

When color filters are formed on a substrate by drawing patterns using such liquid body discharge device, there is a case where the drawing patterns of drawing regions of color pixels, i.e., liquid body discharged regions to which color liquid bodies of R (red), G (green), and B(blue) are discharged, are different in the respective color filters. When a plurality of color filters corresponding to different display sizes from one another is formed on a single substrate, the drawing patterns differ in respective color filters. For example, the color pixels corresponding to R, G, and B each having a rectangular shape with a longitudinal side are employed, the longitudinal direction of the color pixel included in one drawing pattern is orthogonal to the longitudinal direction of the color pixel included in another drawing pattern. In this regard, a pixel pitch between the color pixels adjacent each other is different in the longitudinal direction of the pixel and a direction orthogonal to the longitudinal direction, i.e., the pitch in the direction orthogonal to the longitudinal direction is shorter than that in the longitudinal direction. In this case, when color pixels are formed in the polarity of color filters by discharging respective color liquid bodies from nozzles formed in the heads so as to be aligned in predetermined alignment directions, the following problem may occur. If the alignment direction of the nozzles is substantially in parallel with the longitudinal direction of each color pixel, each color pixel can be formed. In contrast, if the alignment direction of the nozzles is substantially orthogonal to the longitudinal direction of each color pixel, some color pixels are not formed because the pixel pitch is shorter in the alignment direction of the nozzles.

To cope with such problem, the alignment direction of the nozzles needs to be optimized in a direction based on each drawing pattern. For example, JP-A-2002-273868 discloses a technique in which the alignment direction of nozzles (a nozzle group) is rotated to an angle suitable for the pixel pitch of respective color pixels to draw patterns.

When the alignment direction of the nozzles is rotated as described above, the head needs to be provided with a rotating mechanism to rotate the nozzle group. This added rotating mechanism causes a problem in that it is not easy to replace the head since the head becomes heavy due to the weight of the mechanism. In addition, another problem arises in that the position of the nozzle group after being rotated is varied due to uneven rotations or backlashes occur in no small part of rotating mechanisms, resulting in the liquid bodies being not discharged at desired positions.

SUMMARY

An advantage of the present invention is to provide a liquid body discharge device and a method for discharging a liquid body that can draw patterns different from each other without employing a rotating mechanism to rotate an alignment direction of nozzles.

According to a first aspect of the invention, a liquid body discharge device includes a head and a plurality of nozzles provided to the head. In the device, the liquid body is discharged from the plurality of nozzles to a liquid body discharged region of a substrate by moving one of the substrate and the head, and the nozzles are aligned in a first alignment direction and a second alignment direction.

The device can discharge the liquid body from the nozzles aligned in a different alignment direction each other to the liquid body discharged region. For example, when a color filter has drawing patterns different each other in a shape of color pixels or the like, the liquid body can be discharged from the nozzles aligned in an alignment direction suitable for a desired drawing pattern. Thus, the device can draw the drawing patterns different each other without providing a rotating mechanism to rotate the alignment direction of the nozzles to the head. As a result, the head does not become heavy and positioning shifts of the nozzles do not occur.

The device may further include: a moving path along which the head moves; a head moving unit that moves the head in a first direction along the moving path when the liquid body is discharged from the nozzles aligned in the first alignment direction to the liquid body discharged region; and a substrate moving unit that moves the substrate in a second direction different from the first direction when the liquid body is discharged from the nozzles aligned in the second alignment direction to the liquid body discharged region.

Since the head is moved in the first direction by the head moving unit while the substrate is moved in the second direction by the substrate moving unit in the liquid body discharged region, the liquid body can be discharged to the liquid body discharged region from the nozzles aligned in one alignment direction in the first direction and from the nozzles aligned in the other alignment direction in the second direction. For example, when a color filter has drawing patterns different each other in a shape of color pixels or the like, the liquid body can be discharged from the nozzles aligned in an alignment direction suitable for a desired drawing pattern among the nozzles that move in the first direction or the second direction. Thus, the alignment direction of the nozzles does not need to be rotated in one head, and a rotating mechanism does not need to be provided. As a result, the head does not become heavy and positioning shifts of the nozzles due to the rotation of the mechanism do not occur.

The device may further include: a moving path along which the head moves; and a substrate moving unit that moves the substrate in a first direction along the moving path when the liquid body is discharged from the nozzles aligned in the first alignment direction to the liquid body discharged region, and in a second direction different from the first direction when the liquid body is discharged from the nozzles aligned in the second alignment direction to the liquid body discharged region.

Accordingly, when the substrate is moved in the first and second directions by the substrate moving unit in the liquid body discharged region, the liquid body can be discharged to the liquid body discharged region from the nozzles aligned in one alignment direction in the first direction and from the nozzles aligned in the other alignment direction in the second direction. For example, when a color filter has drawing patterns different each other in a shape of color pixels or the like, the liquid body can be discharged from the nozzles aligned in an alignment direction suitable for a desired drawing pattern among the nozzles that move in the first direction or the second direction. Thus, the alignment direction of the nozzles does not need to be rotated in one head, and a rotating mechanism does not need to be provided. As a result, the head does not become heavy and positioning shifts of the nozzles due to the rotation of the mechanism do not occur.

In the device, the head may include at least a plurality of heads, and the heads having the nozzles aligned in the first alignment direction may be disposed so that the nozzles of the heads are not overlapped each other when viewed from the first direction.

Since the heads that relatively move in the first direction are arranged so that the positions of the nozzles are not overlapped each other in the direction orthogonal to the first direction, when each head relatively moves in the first direction with respect to the liquid body discharged region, the width of a region widens in which the liquid bodies are discharged to the liquid body discharged regions from the nozzles. Accordingly, the area of the liquid body discharged regions covered by the one time movement of the heads becomes large. As a result, the number of head movements to discharge the liquid bodies to all the liquid body discharged regions can be reduced.

In the device, the first alignment direction and the second alignment direction may be substantially orthogonal to each other.

Since the nozzles are aligned in a nearly orthogonal relation, there is a high probability that the nozzles having a preferable alignment direction depending on a shape of the liquid body discharged regions exist.

In the device, the first direction and the second direction may be substantially orthogonal to each other.

Generally, the shape of the liquid body discharged region is often a rectangle having sides making a right angle. In such case, the liquid body can be discharged from the nozzles aligned in a direction suitable for the shape of the liquid body discharged region since the first and second directions are substantially orthogonal to each other.

The device may further include at least one head that includes the nozzles aligned in the second direction and moves along the moving path.

This structure allows the number of heads having the nozzles aligned in the second direction to increase among the heads that move along the moving path. Accordingly, when the liquid body is discharged from the nozzles to the liquid body discharged region, the area of the liquid body discharged region to which the liquid body is discharged during the movement of the substrate can be enlarged. For example, when a color filter has drawing patterns different each other in a shape of color pixels or the like and the drawing patterns are drawn by moving the substrate, the liquid body can be discharged by increasing the number of nozzles aligned in an alignment direction suitable for a desired pattern.

According to a second aspect of the invention, a method for discharging a liquid body includes: (a) moving a head in a first direction along a moving path when a liquid body is discharged from a plurality of nozzles aligned in a first alignment direction to a liquid body discharged region of a substrate; and (b) moving the substrate in a second direction different from the first direction when the liquid body is discharged from a plurality of nozzles aligned in a second alignment direction to a liquid body discharged region. In the method, the head includes the plurality of nozzles aligned in the first alignment direction and the second alignment direction different from the first alignment direction.

According to the method, in the liquid body discharged region, the head moves in the first direction while the substrate moves in the second direction. Thus, the liquid body can be discharged to the liquid body discharged region from the nozzles aligned in one alignment direction in the first direction and from the nozzles aligned in the other alignment direction in the second direction. For example, when a color filter has drawing patterns different each other in a shape of color pixels or the like, the liquid body can be discharged from the nozzles aligned in an alignment direction suitable for a desired drawing pattern.

According to a third aspect of the invention, a method for discharging a liquid body includes: (c) moving a head in a first direction along a moving path when a liquid body is discharged from a plurality of nozzles aligned in a first alignment direction to a liquid body discharged region of a substrate; and (d) moving the substrate in a second direction different from the first direction when the liquid body is discharged from a plurality of nozzles aligned in a second alignment direction to a liquid body discharged region. In the method, the head includes the plurality of nozzles aligned in the first alignment direction and the second alignment direction different from the first alignment direction.

According to the method, in the liquid body discharged region, the substrate moves in the first and second directions. Thus, the liquid body can be discharged to the liquid body discharged region from the nozzles aligned in one alignment direction in the first direction and from the nozzles aligned in the other alignment direction in the second direction. For example, when a color filter has drawing patterns different each other in a shape of color pixels or the like, the liquid body can be discharged from the nozzles aligned in an alignment direction suitable for a desired drawing pattern.

In the method, a total area of the liquid body discharged region in step (a) may be smaller than a total area of the liquid body discharged region in step (b).

There may be a case where the head takes longer time than the head when they move in the liquid body discharged region. This is because of the following reason. There is a high possibility that the discharged position accuracy of the liquid body to the liquid body discharged region is worse when the head moves rather than the substrate moves since the head is heavy or the accuracy is affected by the vibrations caused by the movement of the head. To avoid the problem, the moving speed of the substrate is set lower than that of the head. Consequently, time taken to discharge the liquid body to all the liquid body discharged regions can be suppressed from increasing by setting the total area of the liquid body discharged regions to which the liquid body is discharged by moving the carriage is smaller than that to which the liquid body is discharged by moving the substrate.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
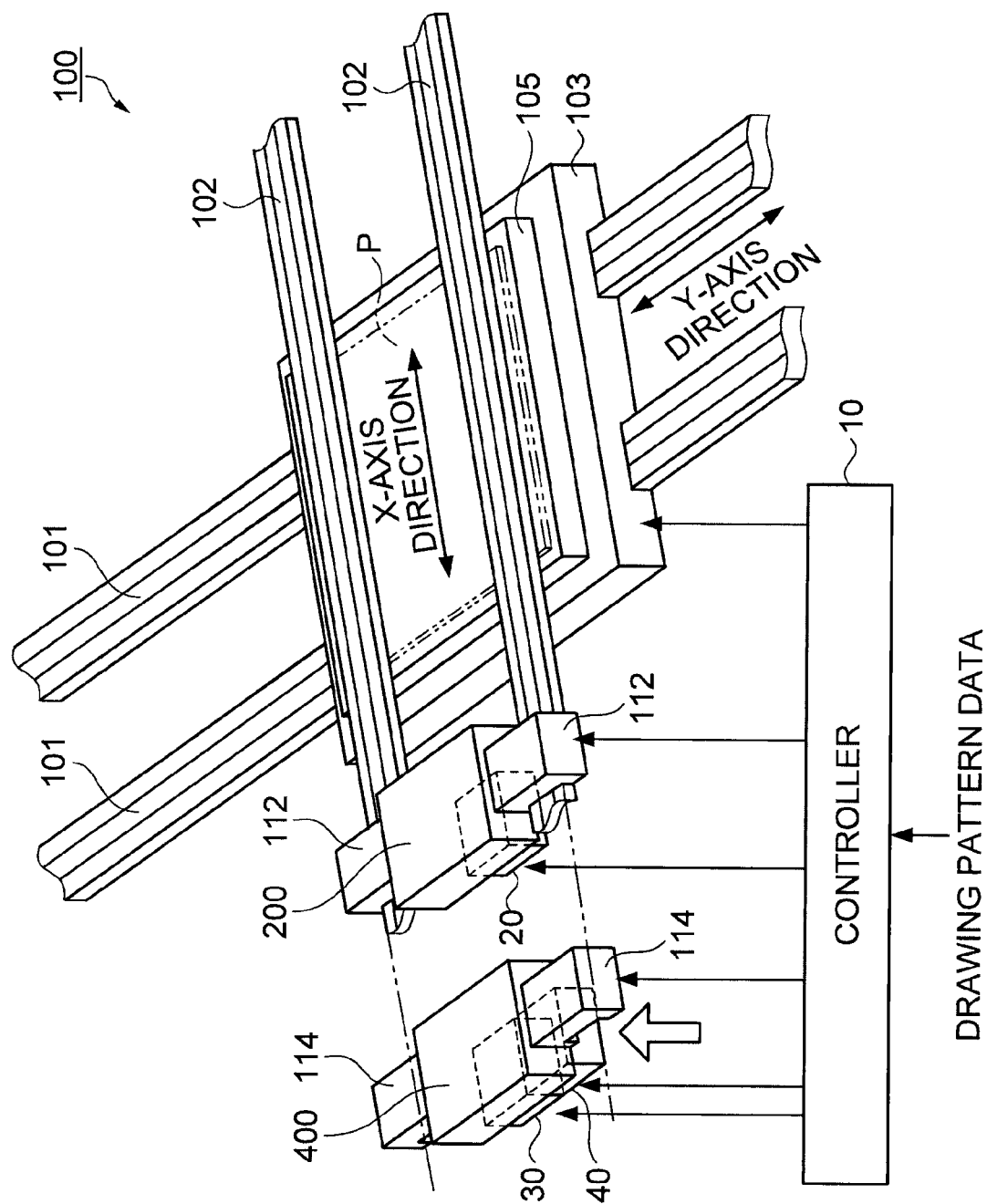
FIG. 1 is a schematic configuration view of a liquid body discharge device according to an embodiment of the invention.

An embodiment of the invention will now be described below. FIG. 1 is a perspective view illustrating a schematic configuration of a liquid body discharge device 100 of the embodiment. The liquid body discharge device 100 of the embodiment is a device to form a color filter by discharging color liquid bodies in red (R), green (G), and blue (B) respectively on color pixels formed on a substrate P. The substrate P is an object to be discharged and the color pixels are regions to be discharged.

As shown in FIG. 1, the liquid body discharge device 100 is provided with a pair of guide rails 101 that are linearly disposed, and a movable stage 103 moving in a linear axis direction (i.e., a Y-axis direction in the embodiment) by air sliders and linear motors (not illustrated) disposed inside the guide rails 101. On the movable stage 103, a stage 105 on which the substrate P is placed is formed. The stage 105 is adapted to suck and fix the substrate P.

Above the stage 105, a pair of guide rails 102 is disposed apart from the stage 105 with a predetermined distance, i.e., disposed at a side adjacent to one surface of the stage 105 having the other surface, which is opposite to the one surface, facing the movable stage 103. In the embodiment, a direction from the one surface of the stage 105 to the pair of the guide rails 102 is referred to as an upper direction while a direction opposite to the upper direction is referred to as a lower direction. The guide rails 102 are disposed to have a linear axis direction different from that of the guide rails 101. In the embodiment, this linear axis direction is referred to as an X-axis direction.

The liquid body discharge device 100 is provided with a carriage 200 and a carriage 400 that move along the pair of the guide rails 102. That is, the carriage 200 is provided with a carriage moving stage 112 at its both sides, and adapted to be movable along the X-axis direction with air sliders and linear motors (not illustrated) disposed inside the guide rails 102. The carriage moving stage 112 is integrally or separately provided to the carriage 200. Likewise, the carriage 400 is provided with a carriage moving stage 114 at its both sides, and adapted to be movable along the X-axis direction with air sliders and linear motors (not illustrated) disposed inside the guide rails 102. The carriage moving stage 114 is integrally or separately provided to the carriage 400.

The carriage 200 is provided with a nozzle head 20 at the lower direction side. The nozzle head 20 includes a plurality of nozzles and discharge mechanisms. The nozzles are drilled and formed so as to show a predetermined alignment direction and discharge liquid bodies having different colors. Each nozzle is provided with the discharge mechanism so as to discharge liquid bodies. Likewise, the carriage 400 is provided with a nozzle head 30 and a nozzle head 40 at the lower direction side. The nozzle heads 30 and 40 are disposed adjacent each other. Each of the nozzle heads 30 and 40 includes a plurality of nozzles and discharge mechanisms. The nozzles are drilled and formed so as to show a predetermined alignment direction and discharge liquid bodies having different colors. Each nozzle is provided with the discharge mechanism so as to discharge liquid bodies. Then, the color liquid bodies having been supplied to the carriages 200 and 400 from a liquid body supplying mechanism (not illustrated) are respectively supplied to the nozzle heads 20, 30, and 40 through flow paths (not illustrated) and discharged from the nozzles as droplets by the discharge mechanisms formed at the nozzles. Each of the nozzle heads 20, 30, and 40 in the embodiment exemplarily corresponds to "head" described in claims.

In the liquid body discharge device 100 of the embodiment, the nozzle heads 20, 30, and 40 are disposed at respective carriages so that the alignment direction of the nozzles formed in the nozzle heads 20 and 40 are the same while the alignment direction of the nozzles formed in the nozzle head 30 is different from those of the nozzle heads 20 and 40. This configuration will be described with reference to FIG. 2.

Figure 2:
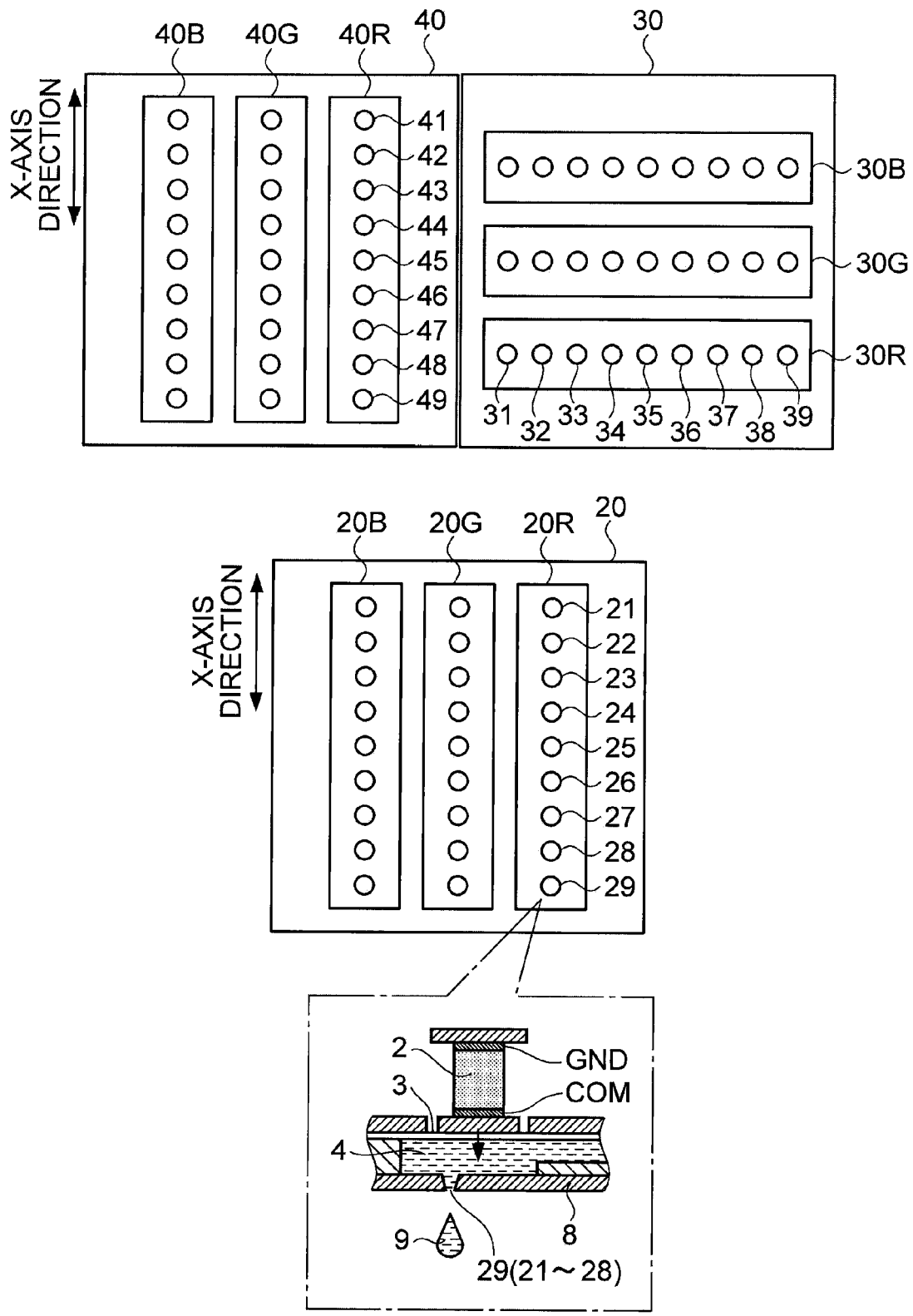
FIG. 2 is a schematic view illustrating an arrangement of nozzles drilled and formed in a nozzle head.

FIG. 2 schematically illustrating the arrangements of the nozzles formed in the nozzle heads 20, 30, and 40 in a view seen from the lower direction as indicated by an outlined arrow in FIG. 1. Here, the nozzle head 20 disposed at the carriage 200 is shown on the bottom side in FIG. 2 while the nozzle heads 30 and 40 disposed at the carriage 400 are shown on the top side in FIG. 2. The X-axis direction is also shown in FIG. 2. The nozzle heads 30 and 40 are disposed adjacent each other in a direction orthogonal to the X-axis direction.

In the embodiment, as illustrated, the nozzle head 20 is provided with nozzle groups 20R, 20G, and 20B for discharging respective liquid bodies corresponding to R, G, and B. Further, each of the nozzle groups 20R, 20G, and 20B includes a nozzle row in which the nozzles 21 to 29, i.e., 9 nozzles, are aligned in a nearly linear line. The alignment direction of the nozzles coincides with the X-axis direction.

Likewise, as illustrated, the nozzle head 40 is provided with nozzle groups 40R, 40G, and 40B for discharging respective liquid bodies corresponding to R, G, and B. Each of the nozzle groups 40R, 40G, and 40B also includes a nozzle row in which the nozzles 41 to 49, i.e., 9 nozzles, are aligned in a nearly linear line. The alignment direction coincides with the X-axis direction same as that of the nozzle head 20.

Likewise, as illustrated, the nozzle head 30 disposed adjacent to the nozzle head 40 is provided with nozzle groups 30R, 30G, and 30B for discharging respective liquid bodies corresponding to R, G, and B. Each of the nozzle groups 30R, 30G, and 30B also includes a nozzle row in which the nozzles 31 to 39, i.e., 9 nozzles, are aligned in a nearly linear line. However, the alignment direction is orthogonal to the X-axis direction unlike the nozzle head 40.

Each of the nozzles drilled and formed in the nozzle heads 20, 30, and 40 is provide with the discharge mechanism so as to discharge the liquid body of a predetermined amount from the nozzle by applying pressure to the liquid body inside the nozzle head. The discharge mechanisms for all the nozzles have similar configurations.

The discharge mechanism has a configuration as shown in a balloon in FIG. 2 in the embodiment, and includes a piezoelectric element 2 provided as an actuator. The piezoelectric element 2 is deformed and contracted or deformed and extended by an electrostrictive property, when a predetermined voltage waveform is applied between an electrode COM and an electrode GND that are disposed at opposite ends of the piezoelectric element 2, resulting in deforming the vibration plate 3 so as to pressurize a liquid body in a pressure chamber 4 formed in the middle of the liquid body flow path. As a result, the pressurized liquid body is discharged as a droplet 9 from the nozzle 29 (or 21 to 28) drilled and formed in a bottom member 8 of the nozzle head. Alternatively, a so-called thermal system using a heating element as an actuator can be also employed as the discharge mechanism.

In the embodiment, the nozzle group having 9 nozzles is exemplified for simplifying explanation. However, in fact, several tens to several hundreds of nozzles are respectively formed in a predetermined pitch. In addition, the nozzle group may include a plurality of nozzle rows, such as two nozzle rows. In a case of having two nozzle rows, the nozzles are drilled and formed to be shifted by a half pitch from one nozzle row from another so as to form a zigzag arrangement, for example. Further, a plurality of nozzle groups may be formed corresponding to each of the color liquid bodies. In the embodiment, the pitch of nozzles formed in nozzle heads 20, 30, and 40 are the same. The pitches, of course, may be different from each other.

Referring back to FIG. 1, the liquid body discharge device 100 is provided with a controller 10. The controller 10 controls: the movement of the movable stage 103 in the Y-axis direction, i.e., the movement of the substrate P in the Y-axis direction; the movement of the carriage moving stages 112 and 114 provided to the carriages 200 and 400 in the X-axis direction, i.e., the movement of the carriages 200 and 400 in the X-axis direction; and the driving of the discharge mechanisms formed in the nozzle heads 20, 30, and 40, i.e., the discharging the liquid body, by using data of a drawing pattern drawn on the substrate P. In the embodiment, the drawing pattern data is coordinate data in which each of color pixels of a color filter is defined as a coordinate position on the substrate P.

Figure 3:
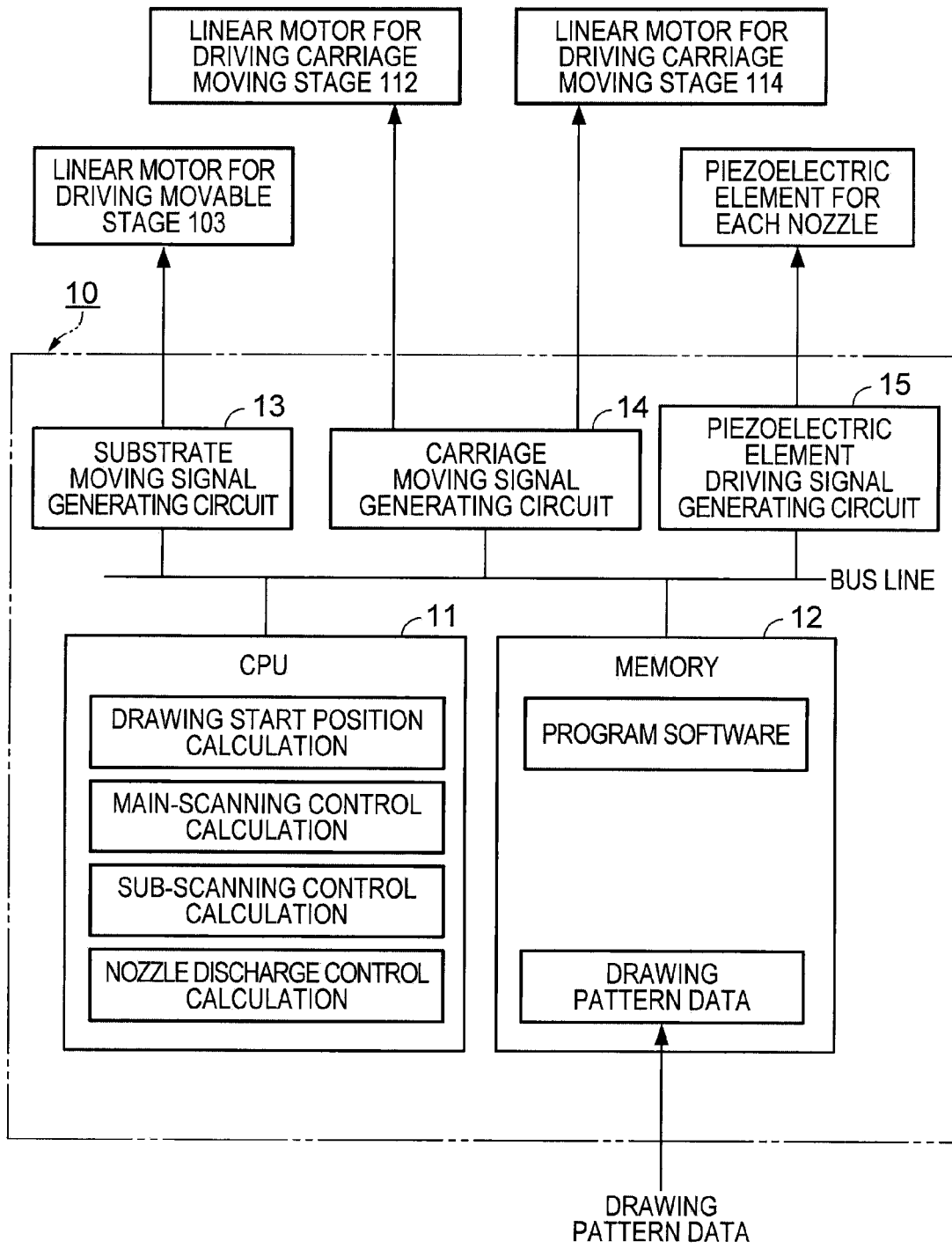
FIG. 3 is a block diagram for explaining a function of a controller.

Next, the controller 10 will be described with reference to a block diagram shown in FIG. 3. The controller 10 includes, as shown in FIG. 3, a CPU 11 and a memory 12 that are coupled to each other through a bus line, a substrate moving signal generating circuit 13, a carriage moving signal generating circuit 14, and a piezoelectric element driving signal generating circuit 15. Each output signal of the substrate moving signal generating circuit 13, the carriage moving signal generating circuit 14, and the piezoelectric element driving signal generating circuit 15 is outputted as a predetermined voltage signal to linear motors for driving the movable stage 103, linear motors for driving the carriage moving stage 112, linear motors for driving the carriage moving stage 114, and the piezoelectric element for each nozzle, through an interface as necessary.

The CPU 11 executes a drawing start position calculation, a main-scanning control calculation, a sub-scanning control calculation, and a nozzle discharge control calculation in order to form a predetermined drawing pattern on the substrate P by discharging each color liquid body based on drawing pattern data that is inputted to the controller 10 and stored in the memory 12 through an interface (not illustrated) or the like.

Here, the main-scanning means a movement while nozzles discharge liquid bodies in a path where the substrate P and the nozzles are relatively moved. A main-scanning direction may be a moving direction of a substrate (Y-axis direction) or a moving direction of a carriage (X-axis direction) depending on a drawing pattern. The sub-scanning means a movement without discharging liquid bodies from nozzles after one main-scanning and before next main-scanning in a path where the substrate P and the nozzles are relatively moved. A sub-scanning direction may be the moving direction of a substrate (Y-axis direction) or the moving direction of a carriage (X-axis direction) depending on a drawing pattern.

The CPU 11 controls the substrate moving signal generating circuit 13 and the carriage moving signal generating circuit 14 based on the calculated control data of the main-scanning and the sub-scanning, generating and outputting a driving signal for each of the linear motors. Concurrently, the CPU 11 controls the piezoelectric element driving signal generating circuit 15 based on the calculated control data to discharge each color liquid body from nozzles during the main-scanning so as to output driving signals for the piezoelectric elements.

Accordingly, the liquid body discharge device 100 of the embodiment allows the nozzle groups 20R, 20G and 20B, or the nozzle groups 30R, 30G and 30B, or the nozzle groups 40R, 40G, and 40B to relatively move with respect to the substrate P by moving the movable stage 103, or the carriage moving stage 112 or the carriage moving stage 114, while controlling the discharge mechanism formed on each nozzle to control ON (to discharge) and OFF (not to discharge) states of the liquid body discharge. As a result, the liquid body is discharged at a position along a main-scanning trajectory of the nozzles 21 to 29 or the nozzles 31 to 39 or the nozzles 41 to 49 on the substrate P, thus drawing a predetermined pattern. In each of the nozzle groups, a few nozzles positioned at an end may not be used in view of the difference in discharging characteristics from other nozzles.

Figure 4:
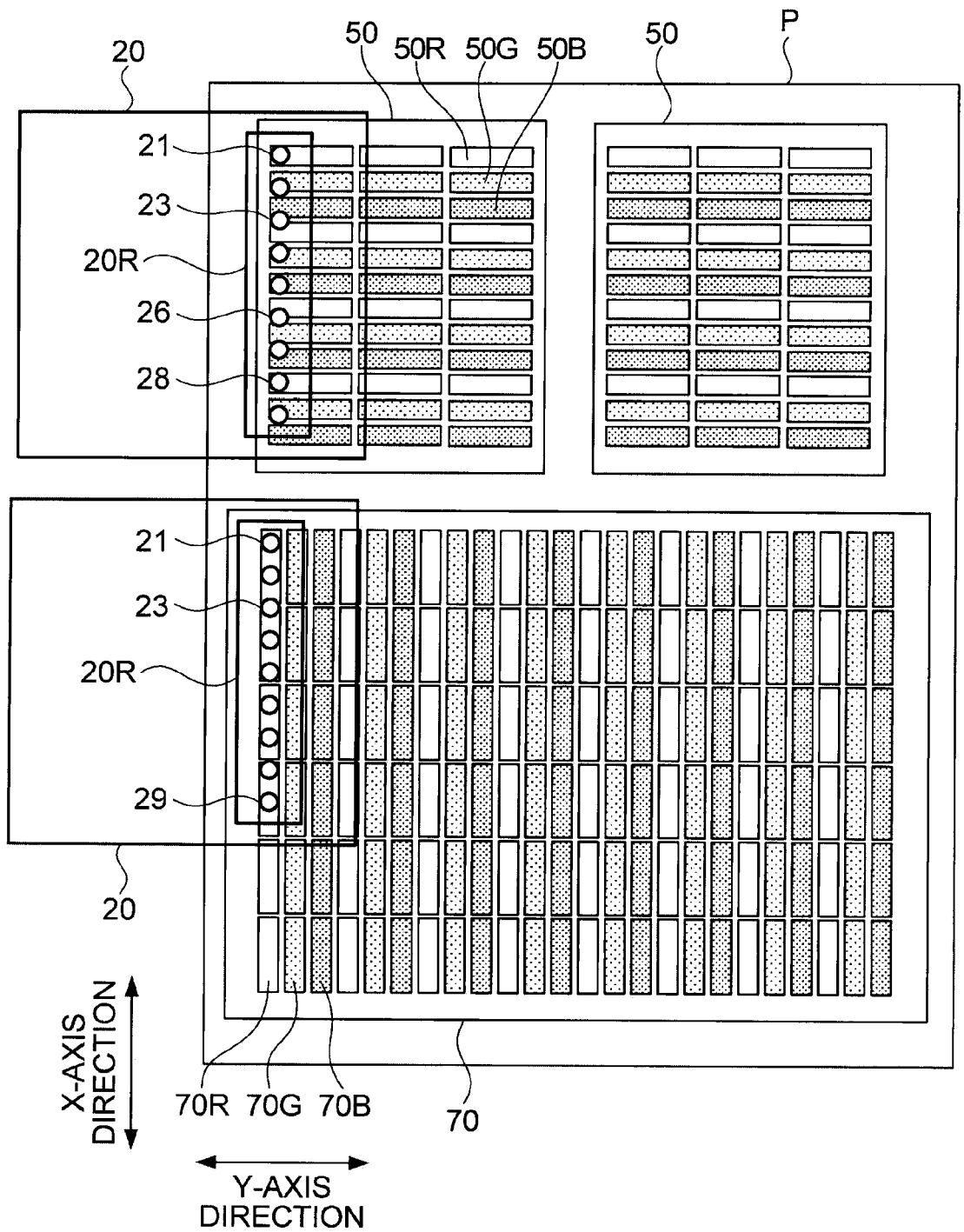
FIG. 4 is an explanatory view to explain a method for drawing a pattern to form a color filter on a substrate according to another embodiment of the invention.
Figure 5:
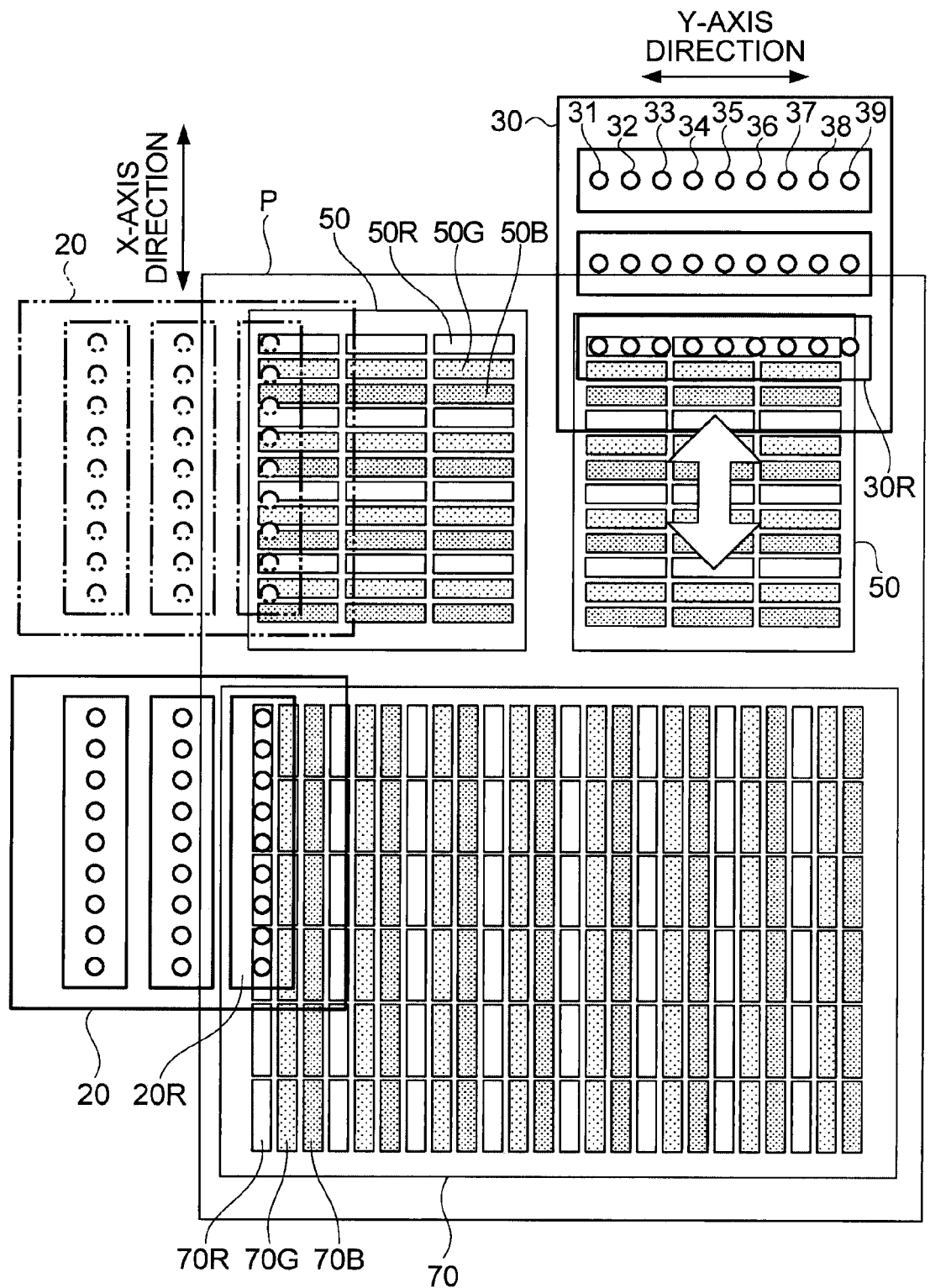
FIG. 5 is an explanatory view to explain a method for drawing a pattern to form a color filter on a substrate according to another embodiment of the invention.

Subsequently, in a case of forming drawing patterns different from each other on the substrate P, a drawing process by the liquid body discharge device 100 of the embodiment will be described. Prior to this, an outline of the process is described with reference to FIGS. 4 and 5. FIGS. 4 and 5 are top views of the substrate P and explaining a relation of liquid body discharged regions of respective colors formed on the substrate P and the nozzle heads. Here, the nozzle heads are shown in a transparent view. In addition, the sizes of the liquid body discharged regions of the respective colors and the nozzle heads are exaggeratingly illustrated for explanatory reasons.

FIG. 4 shows a state in which a color filter 70 for a large screen size and 2 pieces of a color filter 50 each for a small screen size are formed on the substrate P. The color filter 70 has a drawing pattern in which the liquid body discharged region (color pixel) of a rectangular shape having a longitudinal side extending in the X-axis direction is formed in a matrix. The liquid body discharged regions are arranged with a bank or the like made of resin interposed therebetween and form regions 70R, 70G, and 70B, along the Y-axis direction in a stripe arrangement. In the regions, the respective color liquid bodies R, G, and B are repeatedly and subsequently discharged. On the other hand, the color filter 50 has a drawing pattern in which the liquid body discharged region of a rectangular shape having a longitudinal side extending in the Y-axis direction is formed in a matrix. The liquid body discharged regions are arranged with a bank or the like made of resin interposed therebetween and form regions 50R, 50G, and 50B, along the X-axis direction, in a stripe arrangement. In the regions, the respective color liquid bodies R, G, and B are repeatedly and subsequently discharged.

In the embodiment, the Y-axis direction is orthogonal to the X-axis direction. Therefore, the color filter 50 and the color filter 70 have different drawing patterns in the longitudinal direction of the rectangular partitioned region from each other. That is, the longitudinal direction of the liquid body discharged region of the color filter 50 and the longitudinal direction of the liquid body discharged region of the color filter 70 are orthogonal to each other. In a case where a color filter for a large-sized screen and another color filter for a small-sized screen are concurrently drawn in a drawing pattern formed on the substrate P as described above, a case frequently occurs in which the longitudinal directions of the liquid body discharged regions are different from each other, e.g., the longitudinal directions are orthogonal to each other, in order to efficiently utilize the regions of the substrate P.

Now, a case will be exemplified in which patterns to form the color filter 40 and the color filter 70 are drawn on the substrate P by using the carriage 200 regarding the Y-axis direction as the main-scanning direction. In this case, a liquid body R is discharged from the nozzles 21 to 29 in the nozzle group 20R disposed to the nozzle head 20 in the regions 50R and 70R to which the liquid body R is discharged. The following description is also applicable to the nozzle groups 20G and 20B although illustration and description thereof will be omitted. It is also applicable to a case where patterns to form the color filters 50 and 70 by discharging each color liquid body from the nozzle groups 40R, 40G, and 40B disposed to the nozzle head 40 using the carriage 400.

In this case, as illustrated, nozzles other than the nozzle 23 among the nozzles 21 to 29 can discharge the liquid body R in the whole of the regions 70R overlapped with the a scanning trajectory of the nozzles in the color filter 70 with one main-scanning. In contrast, in the color filter 50, since intervals between the regions (i.e., a color pixel pitch) in an alignment direction of the nozzles in the regions 50R, 50G, and 50B are short, a width of the region 50R becomes narrow. Therefore, the nozzles 21 and 28 among the nozzles 21 to 29 can discharge the liquid body R to the region 50R, but the nozzles 23 and 26 become hard to discharge the liquid body R to the region 50R. Accordingly, in a case of the color filter 50, the nozzle head 20 is moved to a position in which the nozzle is overlapped with the region 50R in plan view by moving the nozzle head 20 in the X-axis direction, i.e., by being moved as the sub-scanning, and then the main-scanning is repeatedly required at each time. This increases the number of main-scannings, thereby taking longer time to complete the drawing.

In order to cope with the problem described above, as shown in FIG. 5, the pattern to from the color filter 50 is drawn by using the nozzle head 30 provided to the carriage 400 without using the nozzle head 20 (or the nozzle head 40). That is, as illustrated, a nozzle alignment direction of the nozzle groups in the nozzle head 30 is in the Y-axis direction. Therefore, as shown by the outlined arrow, if the nozzle head 30 is relatively moved to the substrate P in the X-axis direction as the main-scanning direction, one main-scanning enables the nozzles 31 to 39 of the nozzle group 30R to discharge the R liquid body to a nearly whole of the regions 50R overlapped with the main-scanning trajectory of the nozzles, for example. Further, as for the color filter 50, the number of main-scannings is prevented from increasing, thereby also providing an advantageous effect that the time taken to complete the drawing is not longer.

Figure 6:
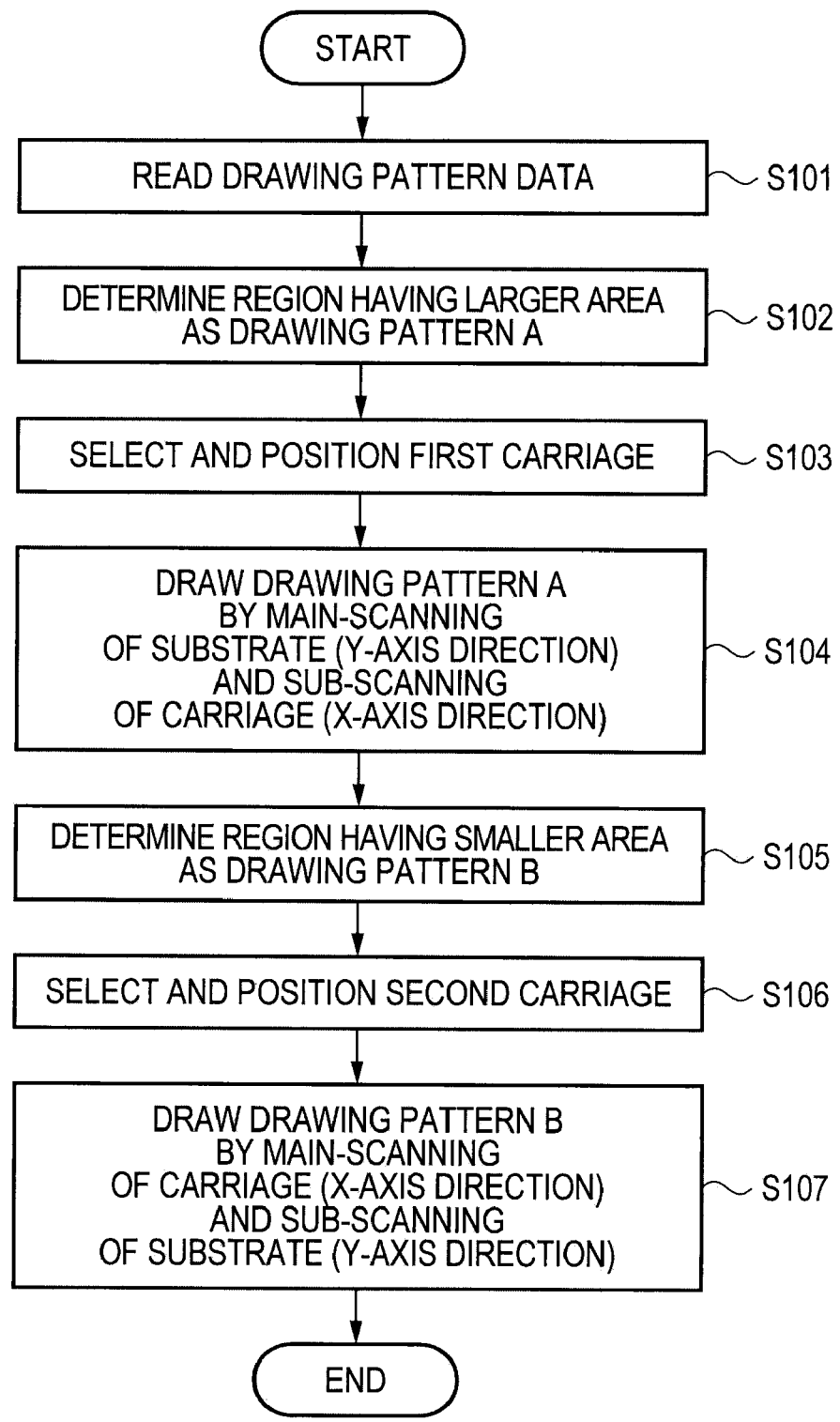
FIG. 6 is a flowchart illustrating processing steps to be conducted by the liquid body discharge device of the embodiment.

Referring now to the flowchart shown in FIG. 6, the drawing process performed by the liquid body discharge device 100 of the embodiment will be described. The procedures of this process are stated in a program software (refer to FIG. 3) stored in the memory 12. The CPU 11 reads and executes the program software.

In a step S101, the drawing pattern data is first read. The drawing pattern data is inputted into the memory 12 of the controller for every substrate P sucked and fixed to the stage 105 shown in FIG. 1. The CPU 11 reads the inputted drawing pattern data. In the embodiment, the drawing pattern data is data for drawing the two pieces of the color filters 50 and the one piece of the color filter 70 as shown in FIG. 4.

Then, in a step S102, a region, to which liquid bodies are discharged, having a larger area is determined as a drawing pattern A. The CPU 11 sums up all region areas of the regions 50R, 50G, and 50B, in which the respective color liquid bodies R, G, and B are discharged, for the two pieces of the color filters 50. Likewise, the CPU 11 sums up all region areas of the regions 70R, 70G, and 70B, in which the respective color liquid bodies R, G, and B are discharged, for the color filter 70. Then, the region having a larger area in total is determined as the drawing pattern A. In the embodiment, each region is indicated by coordinate data. The CPU 11 calculates an area of each region based on the coordinate data.

Then, in a step S103, a first carriage is selected and positioned. The CPU 11 selects the carriages 200 and 400 as the first carriage so as to draw a color pattern of R, G, and B to the color filter 70. Here, the carriage 200 includes the nozzle head 20 having the nozzle alignment direction in the X-axis direction while the carriage 400 includes the nozzle head 40 also having the nozzle alignment direction in the X-axis direction. Then, the linear motors are driven so as to move the carriage moving stage 112 of the carriage 200 and the carriage moving stage 114 of the carriage 400 along the guide rails 102, thus positioning the carriages 200 and 400 at respective calculated drawing start positions. In the embodiment, the substrate P is preliminary sucked and fixed on the stage 105 so that the longitudinal directions of the liquid body discharged regions in the drawing pattern of the color filter 70 are parallel to the X-axis direction.

Figure 7:
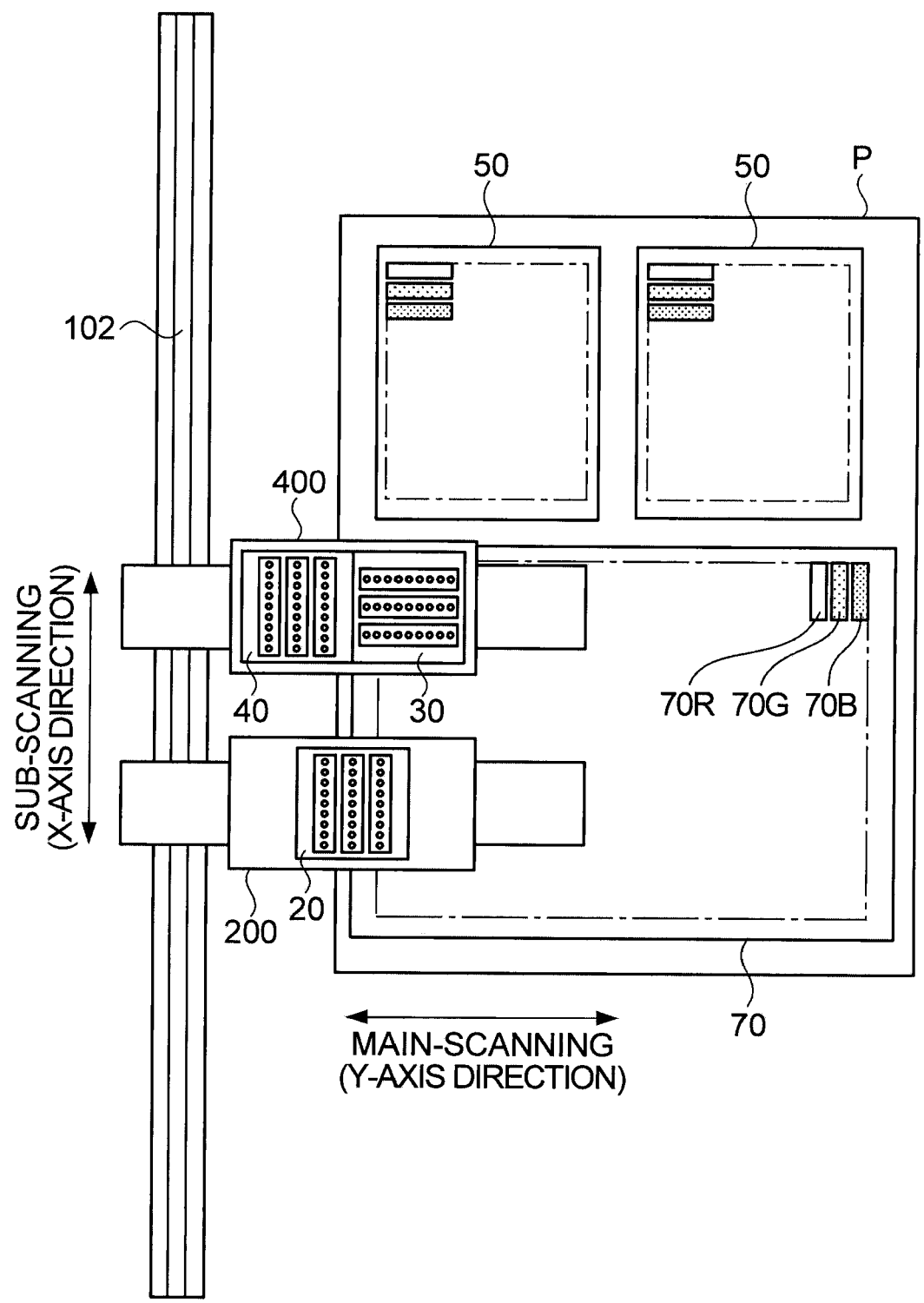
FIG. 7 is a schematic view illustrating a state in which a pattern to form a color filter is drawn by the nozzle head.

Next, in a step S104, the substrate P is moved as the main-scanning (in the Y-axis direction) and the carriage is moved as the sub-scanning (in the X-axis direction) so as to draw the drawing pattern A. This will be explained with reference to FIG. 7. FIG. 7 is a schematic view illustrating a state in which the color filter 70 is formed by the nozzle head 20 included in the carriage 200 and the nozzle head 40 included in the carriage 400 when the substrate P is viewed from the top. One of the pair of guide rails 102 (in the right side in FIG. 7) is omitted so as to avoid complication of the diagram. Here, the nozzle heads 20, 30 and 40 are shown in a transparent view.

As illustrated, the substrate P is moved as the main-scanning along the pair of guide rails 101 (not illustrated) in the Y-axis direction. During the main-scanning, the piezoelectric element in the discharge mechanism formed on each of the nozzles of the nozzle head 20 is driven, discharging the color liquid bodies on the regions 70R, 70G, and 70B from the respective nozzles (Only a part thereof is shown in FIG. 7). On the other hand, the carriages 200 and 400 are moved as the sub-scanning along the guide rails 102 in the X-axis direction. At each time of the sub-scanning of the carriages 200 and 400, the substrate P is repeatedly moved as the main-scanning so as to discharge the respective color liquid bodies in all of the regions 70R, 70G, and 70G. The drawing pattern A that is the drawing pattern for the color filter 70 is thus drawn.

Referring back to FIG. 6, in a step S105, a region, to which liquid bodies are discharged, having a smaller area is determined as a drawing pattern B. The CPU 11 determines the region having a smaller area in total as the drawing pattern B.

In a step S106, a second carriage is selected and positioned. The CPU 11 selects the carriage 400 provided with the nozzle head 30 having nozzles aligned in the Y-axis direction as the second carriage so as to draw a color pattern of R, G, and B on the two pieces of the color filters 50. Then, the linear motors are driven so as to move the carriage moving stage 114 of the carriage 400 along the guide rails 102, thus positioning the carriage 400 at a calculated drawing start position.

Figure 8:
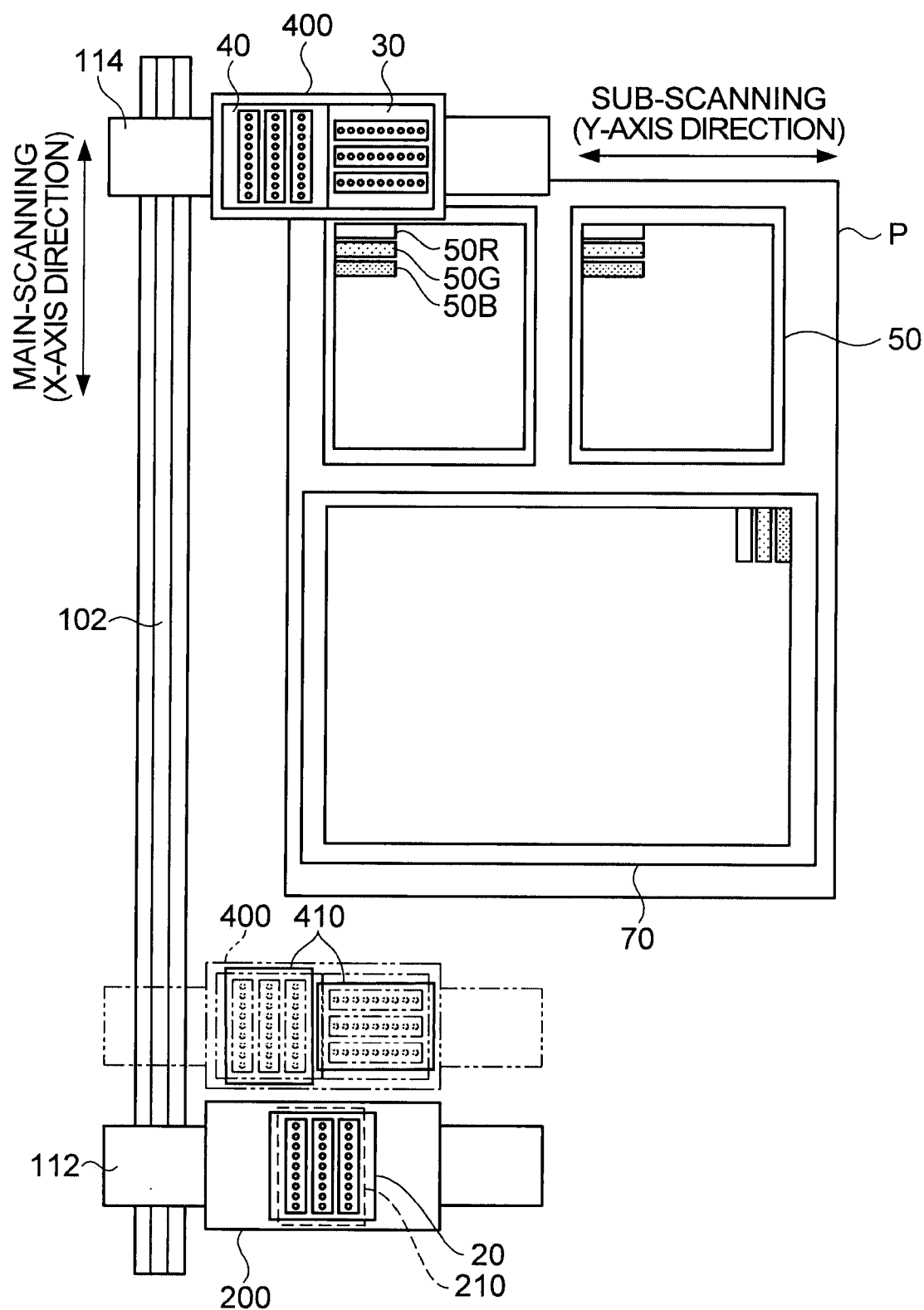
FIG. 8 is a schematic view illustrating a state in which a pattern to form a color filter is drawn by the nozzle head.

Next, in a step S107, the carriage is moved as the main-scanning (in the X-axis direction) and the substrate P is moved as the sub-scanning (in the Y-axis direction) so as to draw the drawing pattern B. This will be explained with reference to FIG. 8. FIG. 8 is a schematic view illustrating a state in which the color filter 50 is drawn by the nozzle head 30 included in the carriage 400 when the substrate P is viewed from the top.

As illustrated, the carriage 400 is moved as the main-scanning along the pair of guide rails 102 (one of them is not illustrated) in the X-axis direction. During the main-scanning, the piezoelectric element in the discharge mechanism formed on each of the nozzles of the nozzle head 30 is driven, discharging the color liquid bodies on the regions 50R, 50G, and 50B from the respective nozzles (Only a part thereof is shown in FIG. 8). On the other hand, the substrate P is moved as the sub-scanning along the guide rails 101 (not illustrated) in the Y-axis direction. At each time of the sub-scanning of the substrate P, the carriage 400 is repeatedly moved as the main-scanning so as to discharge the respective color liquid bodies in all of the regions 50R, 50G, and 50G. The drawing pattern B that is the drawing pattern for the two pieces of the color filters 50 is thus drawn.

Here, in the step S107 in the embodiment, the carriage 200 is moved to a position facing a capping unit 210 provided in an area out of the main-scanning area of the substrate P at the main-scanning in the step S104 so as to cover each of the nozzles in the nozzle head 20. Here, in the area out of the main-scanning area of the substrate P at the main-scanning in the step S104, a capping unit 410 is also provided. The capping unit 210 is a unit to prevent liquid body discharge defects caused by dryness or viscosity increase of the liquid bodies in the nozzles by covering (capping) the nozzle head. Therefore, the unit 210 can prevent dryness or viscosity increase of the liquid bodies in the nozzle head 20 while the pattern to form the color filter 50 is drawn with the nozzle head 30. Further, when the liquid bodies need to be discharged again for drawing, the liquid bodies are always stably discharged from the nozzles.

The capping unit 410 has the same function of the capping unit 210 and caps the nozzle heads 30 and 40. Therefore, when the patterns to form the color filters 50 and 70 are not drawn, the carriage 400 is preferably moved to a position facing the capping unit 410 so as to cap the nozzles of the nozzle heads 30 and 40. This can prevent dryness or viscosity increase of the liquid bodies in the nozzle heads 30 and 40. Further, when the liquid body needs to be discharged again for drawing, the liquid bodies can be always stably discharged from the nozzles.

Accordingly, through the steps S101 to S107, the liquid body discharge device 100 of the embodiment can draw the respective drawing patterns to form the color filters 70 and 50 used for different sized screens by using the carriages 200 and 400 having nozzles differently aligned from each other and allowing the carriages 200 and 400 to move along the pair of the guide rails. The drawing patterns are different from each other in the longitudinal direction of the liquid body discharged region.

Consequently, a rotating mechanism to rotate the alignment direction of the nozzles is not provided, resulting in the nozzle head being free from being weighted by the rotating mechanism. As a result, carriages can be replaced easily. Further, since variation of the nozzle positions caused by the rotating mechanism unlikely occurs, the liquid bodies are discharged at desired positions.

In the embodiment, it is set that the area of the liquid body discharged regions main-scanned by the carriage is smaller than the area of the color liquid body discharged regions scanned by the movement of the substrate P as the main-scanning. This is due to the following reasons. That is, the nozzle head may be provided with structures such as a liquid body tank and a liquid body supplying mechanism other than the discharge mechanism described above. In such a case, the nozzle head may gain a considerable amount of weight. This may make a moving speed of the carriage slower than a moving speed of the substrate. In another case, the movement of the carriage likely causes a vibration of the nozzle head. As a result, the movement of the nozzle head has a higher possibility to worsen the accuracy of a liquid body discharge position in the liquid body discharged regions compared with the movement of the substrate, and thus the moving speed of the carriage needs to be made slower than that of the substrate. In consideration of the case as above, in the embodiment, the area of the liquid body discharged regions main-scanned by the carriage is made smaller than the area of the color liquid body discharged regions scanned by the movement of the substrate P as the main-scanning so as to reduce a moving amount of the carriage. This can minimize a total scanning time required for drawing all the patterns. However, this may not be necessarily performed. In contrast to this, for example, in a case where the moving speed of the carriage is faster than the moving speed of the substrate P, it is preferable that the substrate P be disposed by suction and subjected to drawing in advance so as to make the area of the liquid body discharged regions main-scanned by the carriage larger than the area of the liquid body discharged regions scanned by the movement of the substrate P as the main-scanning.

It should be understood that the invention is not limited to the above-mentioned embodiment, and various changes can be made without departing from the spirit and scope of the invention. Hereinafter, modifications will be described.

First Modification

In the above-described embodiment, the liquid body discharge device includes the carriage 400 provided with the nozzle head having the nozzles aligned in two different directions, i.e., the X-axis direction and the direction orthogonal to the X direction, and the carriage 200 provided with the nozzle head having the nozzles aligned in the X-axis direction. However, needless to say, the invention is not limited to this.

For example, only one piece of the carriage 400 may be provided. In this case, the nozzle head 40 is used to draw the pattern to form the color filter 70 while the nozzle head 30 is used to draw the pattern to form the color filter 50.

Alternatively, the carriage 200 may be provided in a plurality of numbers. This structure increases the number of nozzles aligned in the X-axis direction, increasing the number of nozzles capable of discharging liquid bodies to the liquid body discharged regions when the substrate P is moved as the main-scanning (in the Y-axis direction). Thus, the region area that can be drawn with one time main-scanning of the color filter increases, allowing the number of scannings to be reduced.

In addition to the carriage 400, at least one carriage may be additionally provided that has a nozzle head having nozzles aligned in two different directions, i.e., the X-axis direction and the direction orthogonal to the X-axis direction. In this case, the nozzles that are aligned in the direction orthogonal to the X-axis direction and are included in the nozzle head provided in each carriage including the additional carriage are preferably arranged so that the position of the nozzles, in the direction orthogonal to the X-axis direction, included in each nozzle head is different from each other when viewed from the X-axis direction. Accordingly, a range of the nozzles aligned in the direction orthogonal to the X-axis direction widens, increasing the number of nozzles capable of discharging liquid bodies to the liquid body discharged regions in the main-scanning direction (the X-axis direction) of the carriages. Thus, the region area that can be drawn with one time main-scanning of the color filter increases, allowing the number of scannings to be reduced.

Figure 9:
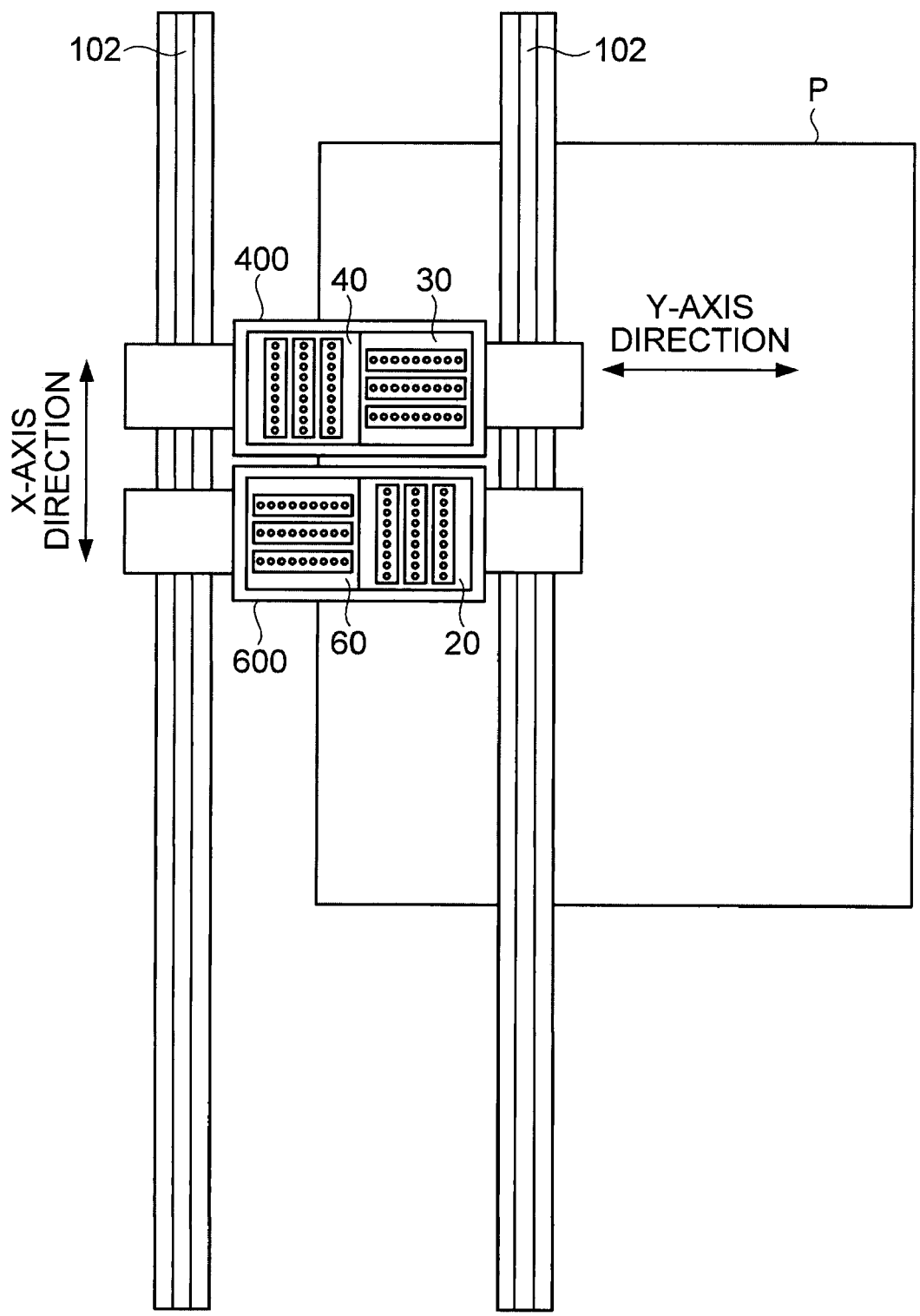
FIG. 9 is an explanatory view to explain the arrangement of nozzles when two carriages having nozzles aligned in a different alignment direction each other are provided in a first modification.

An example of the first modification is shown in FIG. 9. In the example, the carriages 400 and 600 are provided. Each carriage is provided with a nozzle head having the nozzles aligned in two different directions, i.e., the X-axis direction and the direction orthogonal to the X-axis direction. FIG. 9 is a schematic view illustrating an arrangement of the carriages 400 and 600 when the substrate P is viewed from the top. Here, the nozzle heads of the carriages are shown in a transparent view.

As illustrated, the carriage 600 includes a nozzle head 60 adjacent to the nozzle head 20, which is provided to the carriage 200 in the above-described embodiment, in the X-axis direction. The nozzle head 60 has nozzle groups having the nozzle alignment direction in the direction orthogonal to the X-axis direction. The nozzle head 60 is disposed so that the nozzles aligned in the direction orthogonal to the X-axis direction do not overlap with the nozzles included in the nozzle head 30 when the carriage 600 is viewed from the X-axis direction. The carriage 600 is disposed adjacent to and in parallel with the carriage 400 in the X-axis direction, and is adapted to move along the guide rails 102 in the same manner of the carriage 400.

According to the arrangement of the carriages shown in FIG. 9, as clear from the description on FIGS. 4 and 5 in the above-described embodiment, when the substrate P moves in the Y-axis direction so that the carriages 400 and 600 disposed in parallel move relatively in the Y-axis direction, liquid bodies are discharged from the nozzles provided to the nozzle heads 20 and 40 to the liquid body discharged regions. That is, the width of the drawing region of the color filter widens in the Y-axis direction. In contrast, when the carriages 400 and 600 disposed in parallel move in the X-axis direction, liquid bodies are discharged from the nozzles provided to the nozzle heads 30 and 60 to the liquid body discharged regions. Thus, the width of the drawing region of the color filter widens in the X-axis direction. As a result, an area of the liquid body discharged regions to which the liquid bodies are discharged from the nozzles with one time main-scanning is enlarged, thereby reducing the number of scannings required for discharging the liquid bodies to all the regions.

Figure 10:
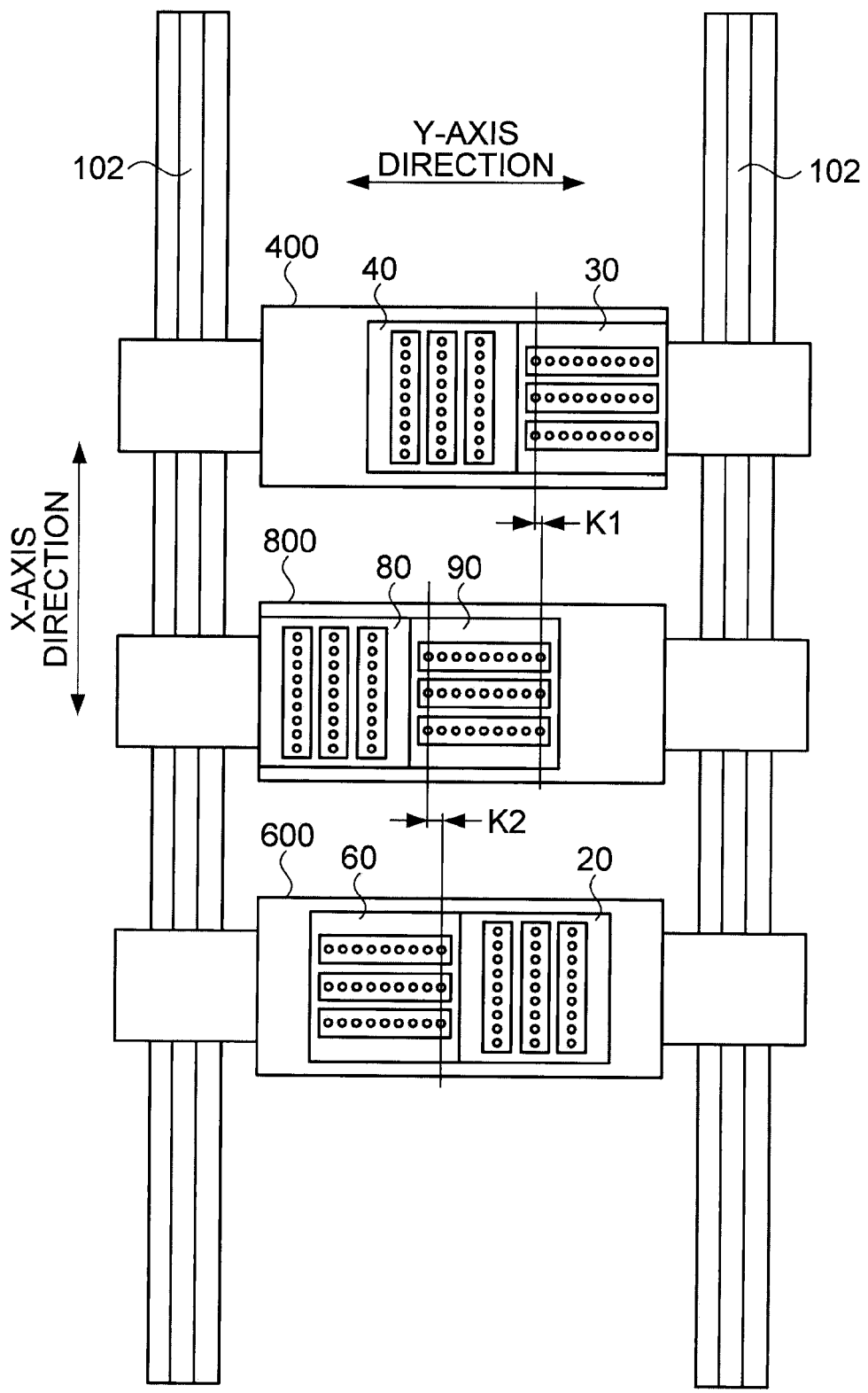
FIG. 10 is an explanatory view to explain the arrangement of nozzles when a plurality of carriages having nozzles aligned in a different alignment direction each other is provided in the first modification.

Another example of the first modification is shown in FIG. 10. In the example, a carriage 800 is provided in addition to the carriages 400 and 600. Each of the carriages 400 and 600 is provided with the nozzle head having the nozzles aligned in two different directions, i.e., the X-axis direction and the direction orthogonal to the X-axis direction. The carriage 800 includes nozzle heads 80 and 90 adjacent each other in the direction orthogonal to the X-axis direction. The nozzle head 80 has nozzle groups having the nozzle alignment direction in the X-axis direction while the nozzle head 90 has nozzle groups having the nozzle alignment direction in the direction orthogonal to the X-axis direction. The carriage 800 is adapted to move along the guide rails 102 in the same manner of the carriage 400 (carriage 600). FIG. 10 is a schematic view illustrating an arrangement of the carriages 400, 600, and 800 when the substrate P is viewed from the top. Here, the nozzle heads of the carriages are shown in a transparent view.

The nozzle groups of the nozzle heads 30, 60, and 90, which are respectively provided to the carriages 400, 600, and 900, form regions K1 and K2 shown in FIG. 10. In the region K1, nozzle arrangement areas of the nozzle groups of the nozzle head 30 and those of the nozzle head 90 are overlapped while in the region K2, nozzle arrangement areas of the nozzle groups of the nozzle head 90 and those of the nozzle head 60 are overlapped when being viewed from the X-axis direction. Accordingly, a range widens in which the nozzles are continuously aligned in the direction orthogonal to the X-axis direction, widening the width of a region in which the liquid body discharged regions to which liquid bodies can be discharged are continuously provided in the main-scanning (the X-axis direction) of the carriages. As a result, there is a possibility to reduce the number of main-scannings of the carriage since the width of a region, to which a pattern can be drawn with one time main-scanning of the carriage, in the color filter can be widened.

Second Modification

In the embodiment described above, the nozzle groups (20R, 20G, and 20B) formed in the nozzle head 20 and the nozzle groups (40R, 40G, and 40B) formed in the nozzle head 40 are aligned in the X-axis direction and the nozzle groups (30R, 30G, and 30B) formed in the nozzle head 30 are aligned in the Y-axis direction that is orthogonal to the X-axis direction. However, needless to say, the invention is not limited to this. For example, the nozzle groups may be inclined at θ degrees with respect to the X-axis direction or the Y-axis direction.

Figure 11:
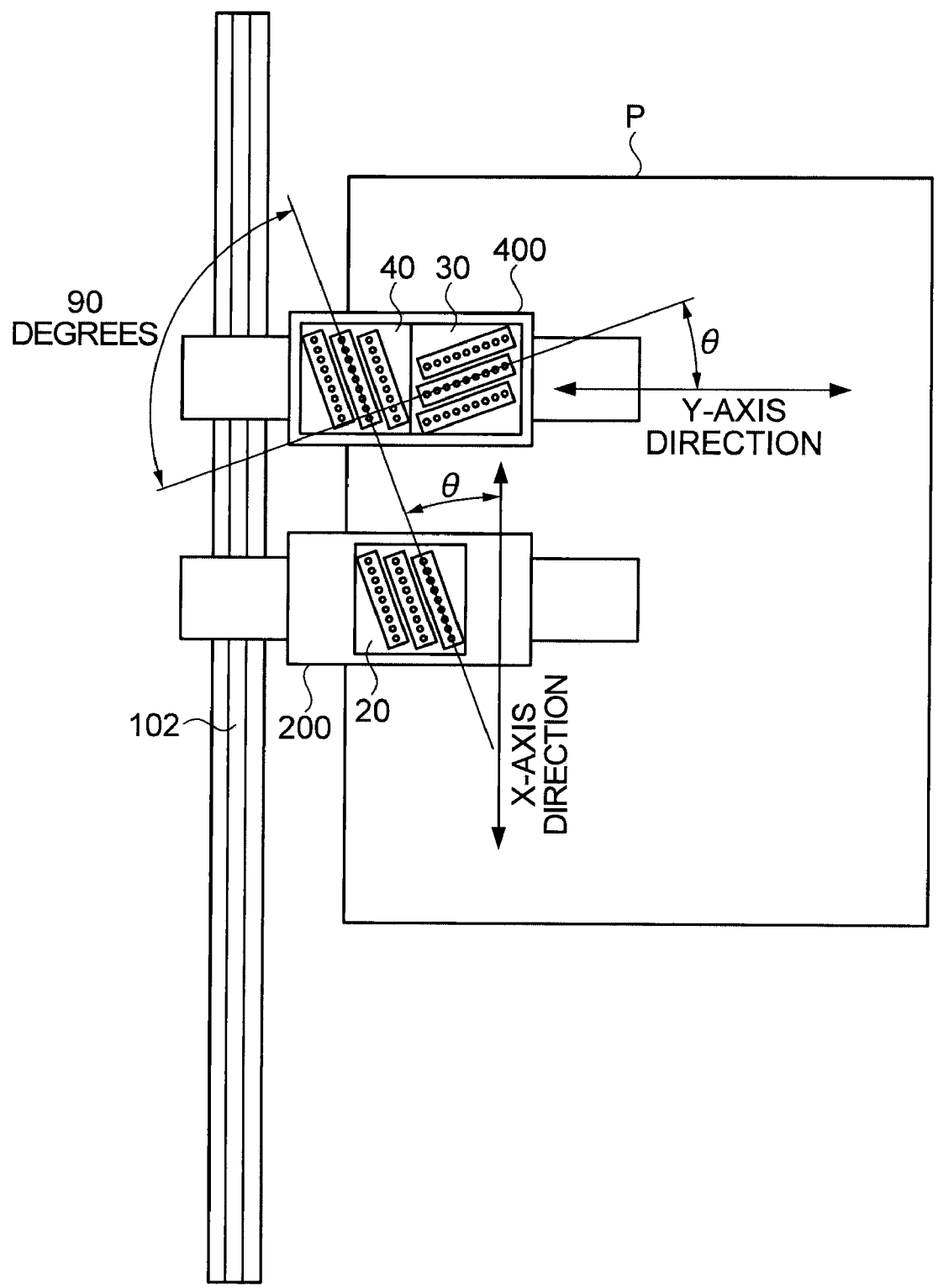
FIG. 11 is a schematic view illustrating a state in which an alignment direction of nozzles is inclined in a second modification.

The second modification will be described with reference to FIG. 11. FIG. 11 is a schematic view illustrating the carriages 200 and 400 viewed from the top. Here, the nozzle heads 20, 30 and 40 are shown in a transparent view.

In the modification, as illustrated, the alignment directions of the nozzle groups formed in the nozzle head 20 of the carriage 200 and the nozzle head 40 of the carriage 400 are inclined at θ degrees in a counterclockwise direction with respect to the X-axis direction. Likewise, the alignment directions of the nozzle groups formed in the nozzle head 30 of the carriage 400 are arranged so as to be inclined at θ degrees in a counterclockwise direction with respect to the Y-axis direction. In this case, nozzle pitches of the nozzle groups are narrowed in the direction orthogonal to the main-scanning direction. Therefore, although the width of a region, to which the liquid bodies are discharged from the nozzles at the main-scanning, of the liquid body discharged regions is narrowed, the number of the nozzles that can discharge the liquid bodies to the liquid body discharged regions is increased. As a result, the number of the liquid body discharged regions to which the liquid bodies cannot be discharged from the nozzles with one main-scanning is reduced, thereby reducing the number of the main-scannings required for discharging the liquid body to all the liquid body discharged regions can be expected.

Further, in the modification, the nozzle head 30 can be concurrently used for drawing at the main-scanning of the substrate P in addition to the nozzle heads 20 and 40. In this case, both the nozzle heads having the nozzles aligned in a nearly orthogonal relation to each other are used, increasing possibility of existence of the nozzles having a preferable alignment direction depending on a shape of the liquid body discharged regions. As a result, increase of the number of the liquid body discharged regions to which the liquid bodies can be discharged with one time main-scanning of the substrate P can be expected. Alternatively, the nozzle head 40 can be concurrently used for drawing at the main-scanning of the carriage 400 in addition to the nozzle head 30. In this case, both the nozzle heads having the nozzles aligned in a nearly orthogonal relation to each other are used, increasing possibility of existence of the nozzles having a preferable alignment direction depending on a shape of the liquid body discharged regions. As a result, increase of the number of the liquid body discharged regions to which the liquid bodies can be discharged with one time main-scanning of the carriage can be expected.

In the second modification, the nozzle groups formed in the nozzle heads 20 and 40 and those in the nozzle head 30 are arranged so that their alignment directions are inclined at the same angle, i.e., θ degrees, in the counterclockwise direction. However, needless to say, the nozzle heads 20, 30 and 40 may be inclined at different angles or in different directions from each other. Based on a shape of the drawing pattern to be formed on the substrate P, inclination of each of the nozzle groups can be set so as to have a preferable value of the nozzle pitch.

Third Modification

In the embodiment, the X-axis direction and the Y-axis direction are orthogonal to each other, i.e., the main-scanning direction and the sub-scanning direction are orthogonal to each other, but not limited to this. Therefore, the X-axis direction and the Y-axis direction may not be orthogonal to each other. The liquid body discharged regions are typically in rectangular shapes each having sides that are orthogonal to each other in most cases. Therefore, the X-axis direction and the Y-axis direction are orthogonal to each other in the embodiment above. However, in a case where the liquid body discharged regions are not in rectangular shapes, the X-axis direction or the Y-axis direction is preferably changed in accordance with the shapes of the liquid body discharged regions as this has a higher possibility of increasing the liquid body discharged regions that can be drawn with one time main-scanning.

Figure 12:
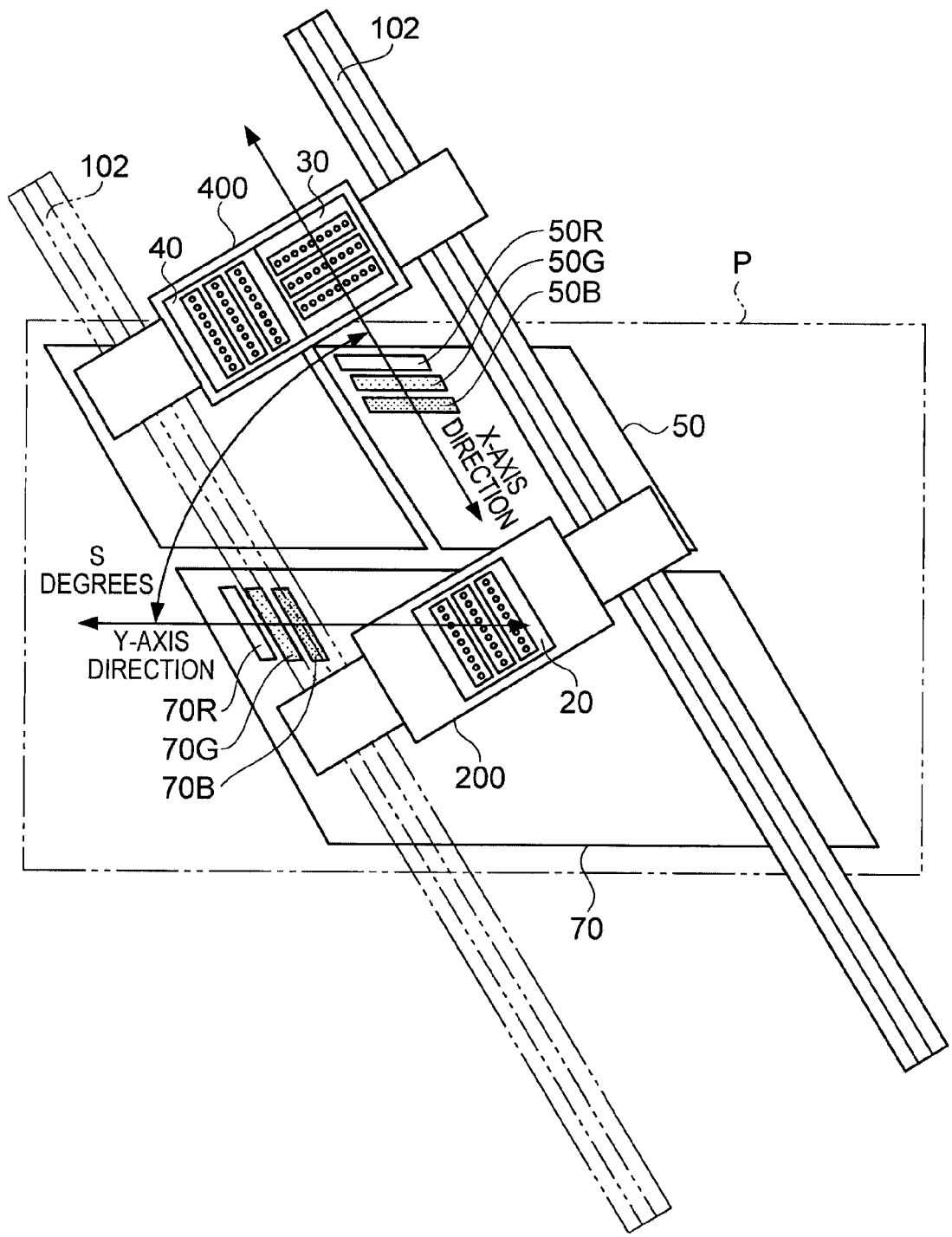
FIG. 12 is a schematic view illustrating a state in which a direction to move carriages is inclined in a third modification.

The third modification will be described with reference to FIG. 12 by using an example. FIG. 12 is a schematic view illustrating the carriages 200 and 400 viewed from the top. Here, the nozzle heads 20, 30 and 40 are shown in a transparent view. As illustrated, the color filter 50 and the color filter 70 are in a parallelogram shape. Each of the liquid body discharged regions 50R, 50G, and 50B and each of the liquid body discharged regions 70R, 70G, and 70B, to which the respective color liquid bodies are discharged, is also in a parallelogram shape. Further, the liquid body discharged regions 50R, 50G, and 50B are arranged along an oblique side of the parallelogram while the liquid body discharged regions 70R, 70G, and 70B are arranged along a bottom of the parallelogram in the Y-axis direction.

In the third modification, the moving direction of the carriages 200 and 400 along the guide rails 102 is inclined at S degrees in a clockwise direction with respect to the Y-axis direction so that the X-axis direction in which the nozzle head 30 moves is parallel to the oblique side of the parallelogram that is the shape of the color filter 50. In this case, the color filter 50 is main-scanned by the nozzle head 30 provided to the carriage 400 moving along the guide rails 102 in the direction in which the liquid body discharged regions 50R, 50G, and 50B are aligned. The color filter 70 is main-scanned by the nozzle head 20 provided to the carriage 200 and the nozzle head 40 provided to the carriage 400 due to the main-scanning of the substrate P in the Y-axis direction in which the liquid body discharged regions 70R, 70G, and 70B are aligned. Therefore, increase of the liquid body discharged regions to which the liquid bodies can be discharged from the nozzles with one time main-scanning can be expected. As a result, the time taken to complete all the drawing patterns can be shortened.

In the third modification, the nozzle head 20 provided to the carriage 200 and the nozzle head 40 provided to the carriage 400 are arranged so that the alignment direction of the heads are in the same direction of the longitudinal direction of the liquid body discharged regions 70R, 70G, and 70B of the parallelogram shape as shown in FIG. 12, but this may not be always required. For example, the nozzles may be aligned in the direction orthogonal to the Y-axis direction that is the main-scanning direction. According to this, increase of the liquid body discharged regions to which the color liquid bodies can be discharged from the nozzles with one main-scanning can be expected as described above.

Fourth Modification

In the embodiment, the carriage 400 is moved as the main-scanning in the X-axis direction while the substrate P is moved as the sub-scanning in the Y-axis direction when the pattern to form the color filter 50 is drawn, but not limited to this. The substrate P may be moved as the main-scanning in addition to being moved as the sub-scanning in the Y-axis direction. As described above, the carriage 400 may move at a slower speed than the substrate P when the carriage 400 is heavy. In this case, the pattern can be drawn faster with the substrate P being moved as the main-scanning rather than the carriage 400 being moved as the main-scanning.

Figure 13:
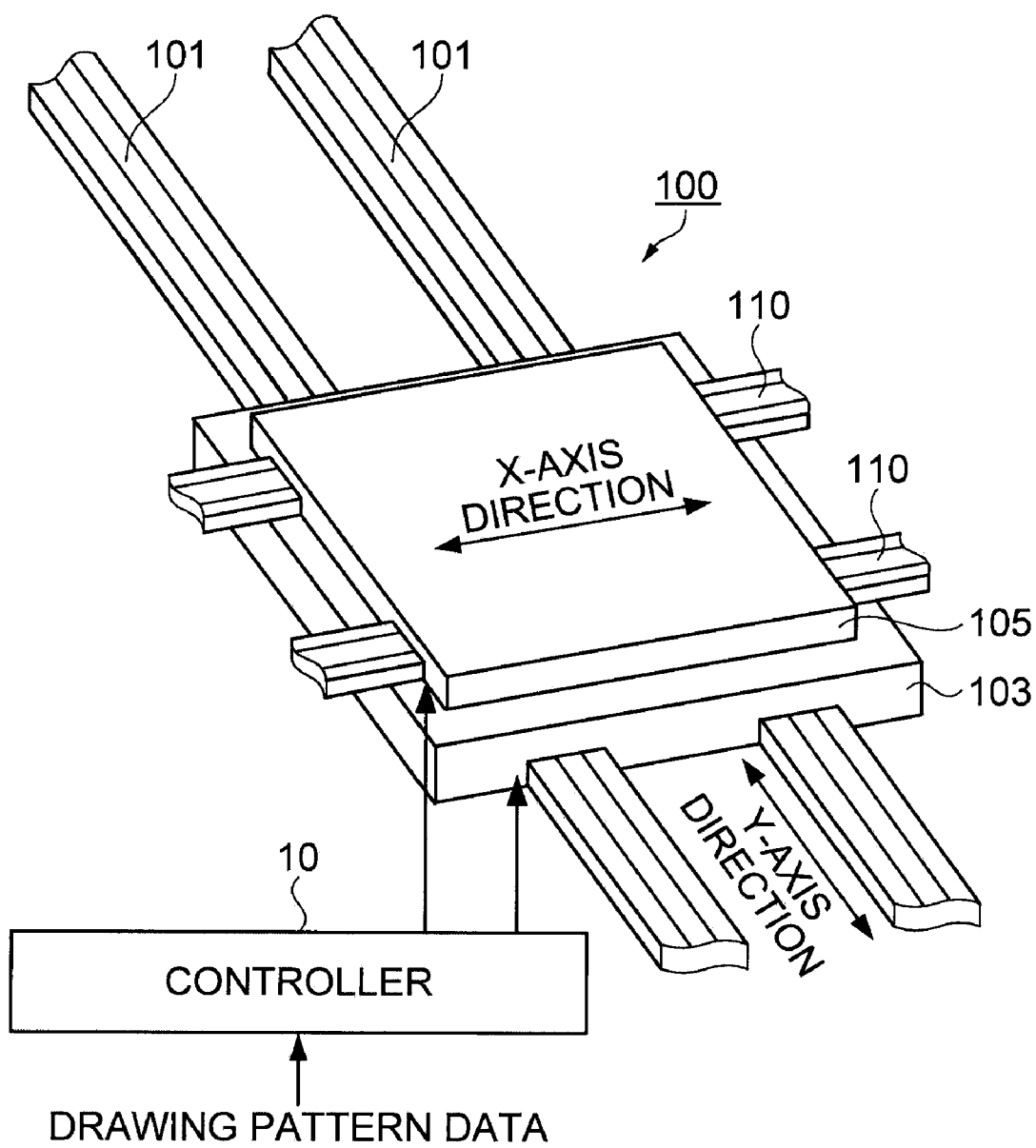
FIG. 13 is a perspective view illustrating a movable stage and a stage.

The fourth modification will be described with reference to FIG. 13 by using an example. FIG. 13 is a perspective view illustrating the moving stage 103 and the stage 105. In the modification, as illustrated, the stage 105 can move in the X-axis direction with respect to the movable table 103 with a pair of guide rails 110 that are linearly disposed on the movable table 103 and air sliders and linear motors (not illustrated) disposed inside the guide rails 110.

The movement of the stage 105 is controlled by the controller 10 in the same manner of the movable stage 103. That is, the CPU 11 drives the linear motors disposed inside the guide rails 110 so that the stage 105 is moved as the main-scanning in the X-axis direction instead of moving the carriage movable stage 114 in the X-axis direction by using data for a drawing pattern drawn on the substrate P.

In the modification, the guide rails 110 are preferably disposed so that the scanning range of the stage 105 is not limited by the capping unit 210 in which the carriage 200 is evacuated when the stage 105 is moved as the main-scanning in the X-axis direction. In addition, when the pattern to form the color filter 70 is drawn, it may be accepted that the carriages 200 and 400 are not moved as the sub-scanning, but the stage 105 is moved as the sub-scanning in the X-axis direction.

Other Modifications

In the embodiment above, the substrate P is preliminary sucked and disposed on the stage 105 so that the longitudinal direction of the liquid body discharged regions in the color filter 70 for the large sized screen is the X-axis direction. The total area of the liquid body discharged regions in the one color filter 70 is larger than the total area of the liquid body discharged regions of two pieces of the color filters 50. Therefore, in the process flow chart shown in FIG. 6, the carriage to be used for each of the main-scanning directions is selected based on the size of the total area of the liquid body discharged regions. However, needless to say, it is not limited to this. For example, the longitudinal direction of the liquid body discharged regions included in each of the color filters formed on the substrate P is calculated from the drawing pattern data, and then, a carriage provided with a nozzle head having the nozzles aligned in a direction closest to the longitudinal direction may be selected. This allows the liquid bodies to be discharged from the nozzles aligned in a preferable direction corresponding to the shape of each of the liquid body discharged regions on the color filter 70 regardless of the total area of the liquid body discharged regions on each of the color filters to be formed on the substrate P.

In the embodiment, the substrate P is moved as the main-scanning in the Y-axis direction, but is not limited to this. The carriages 200 and 400 may be moved as the main-scanning in the Y-axis direction. The point is that the nozzles and the liquid body discharged regions are configured so as to relatively move in the main-scanning movement. In this case, needless to say, the guide rails 102 are configured so as to move in the Y-axis direction.

Further, in the embodiment, the movable stage 103, the carriage moving stages 112 and 114 are moved by the moving unit including the air sliders and the linear motors disposed inside the guide rails 101 and 102. However, it is not particularly limited to this, and thus a moving unit including a motor and a belt, or a moving unit including a ball screw and a motor may also be employed. In other words, any configuration is applicable by which the movable stage 103 and the carriage moving stages 112 and 114 can be moved.

In the embodiment, the color pixels formed in the color filter 50 or the color filter 70 are arranged in a stripe arrangement in which the color pixels of the same color are consecutively formed in the longitudinal direction of the color pixel. However, it is not limited to this, and thus they may be arranged in a delta arrangement, or a mosaic arrangement. Further, the number of color filters is 3 colors of R, G, and B. However, it is not limited to this, the number of colors may be increased to four colors or decreased to 2 colors, for example.

In the embodiment, a relation of the sizes of each color pixel of the color filters 50 and 70 is not particularly described. The color filters 50 and 70 may have color pixels having a same size or may have color pixels having a different size and shape from each other. In other words, any pixel can be employed as long as it has a longitudinal side and a shape that meets the descriptions described with reference to FIGS. 4 and 5.

Further, in the embodiment, the liquid body discharge device 100 that discharges color liquid bodies on a glass substrate so as to form a color filter is described as a liquid body discharge device. However, needless to say, it is not limited to this. For example, the invention may be practiced with a manufacturing device to form a metal wiring pattern by discharging a functional liquid body including a metal material on a silicon substrate, a ceramic substrate, or a resin substrate, other than the glass substrate, or with a device for manufacturing an organic EL element to form a light emitting element by discharging a functional liquid body including a light-emitting material made of an organic material as a solute on a liquid body discharged region. In other words, the invention can be similarly practiced by any device as long as the device can record a pattern such as an image or a graphic, or a letter on a liquid body discharged object such as a substrate by discharging a functional liquid body using a method to discharge a liquid body.

The entire disclosure of Japanese Patent Application No. 2008-14566, filed Jan. 25, 2008 is expressly incorporated by reference herein.

What is claimed is:

1. A liquid body discharge device, comprising:
   a head;
   a plurality of nozzles provided to the head, wherein a liquid body is discharged from the plurality of nozzles to a liquid body discharged region of a substrate by moving one of the substrate and the head, and the plurality of nozzles are aligned in a first alignment direction and a second alignment direction that is different from the first alignment direction;
   a moving path along which the head is moved;
   a head moving unit that is configured to move the head in a first direction along the moving path when the liquid body is discharged from the plurality of nozzles aligned in the first alignment direction to the liquid body discharged region; and
   a substrate moving unit that is configured to move the substrate in a second direction that is different from the first direction when the liquid body is discharged from the plurality of nozzles aligned in the second alignment direction to the liquid body discharged region.

2. The liquid body discharge device according to claim 1, wherein the head includes a plurality of heads, the plurality of heads having the plurality of nozzles aligned in the first alignment direction, and the plurality of nozzles of the plurality of heads are not overlapped each other when viewed from the first direction.

3. The liquid body discharge device according to claim 1, wherein the first alignment direction and the second alignment direction are substantially orthogonal to each other.

4. The liquid body discharge device according to claim 1, wherein the first direction and the second direction are substantially orthogonal to each other.

5. The liquid body discharge device according to claim 1 further comprises at least one head that includes the plurality of nozzles aligned in the second direction and that is moved along the moving path.

6. A liquid body discharge device, comprising:
   a head;
   a plurality of nozzles provided to the head, wherein a liquid body is discharged from the plurality of nozzles to a liquid body discharged region of a substrate by moving one of the substrate and the head, and the plurality of nozzles are aligned in a first alignment direction and a second alignment direction that is different from the first alignment direction;
   a moving path along which the head is moved;
   a substrate moving unit that is configured to move the substrate in a first direction along the moving path when the liquid body is discharged from the plurality of nozzles aligned in the first alignment direction to the liquid body discharged region, and that is configured to move the substrate in a second direction that is different from the first direction when the liquid body is discharged from the plurality of nozzles aligned in the second alignment direction to the liquid body discharged region.

7. A method for discharging a liquid body, comprising:
(a) moving a head in a first direction along a moving path when a liquid body is discharged from a plurality of nozzles aligned in a first alignment direction to a liquid body discharged region of a substrate; and
(b) moving the substrate in a second direction that is different from the first direction when the liquid body is discharged from the plurality of nozzles aligned in a second alignment direction to the liquid body discharged region, wherein the head includes the plurality of nozzles aligned in the first alignment direction and the second alignment direction that is different from the first alignment direction.

8. The method for discharging a liquid body according to claim 7, wherein a total area of the liquid body discharged region in step (a) is smaller than a total area of the liquid body discharged region in step (b).

* * * * *